United States Patent [19]
Laurent

[11] 4,309,896
[45] Jan. 12, 1982

[54] PICK-UP FOR MEASURING FORCES OR WEIGHT LOADS

[76] Inventor: Malchair Laurent, Boulevard d'Avroy 55/021, 4000 Liege, Belgium

[21] Appl. No.: 33,662

[22] Filed: Apr. 26, 1979

[30] Foreign Application Priority Data

Apr. 28, 1978 [BE] Belgium ............................. 46456

[51] Int. Cl.³ ............................................. G01L 25/00
[52] U.S. Cl. ................................. 73/1 B; 73/862.58
[58] Field of Search ................... 73/1 B, 4 R, 141 R; 177/208, 209

[56] References Cited
U.S. PATENT DOCUMENTS

| | | | |
|---|---|---|---|
| 2,604,035 | 7/1952 | Shipley et al. | 177/208 |
| 2,793,850 | 5/1957 | Eckman | 177/209 |
| 3,062,046 | 11/1962 | Evans | 73/1 B |
| 3,261,203 | 7/1966 | Young | 73/141 R |

*Primary Examiner*—S. Clement Swisher
*Attorney, Agent, or Firm*—Martin A. Farber

[57] ABSTRACT

The pick-up is characterised in that it comprises a body which is flexible in its length and fixed in its cross-section and which is disposed between a plate for receiving the applied force and a support plate, the said body containing a liquid which converts the force into pressure, said body also being connected to a pressure transmitter.

6 Claims, 11 Drawing Figures

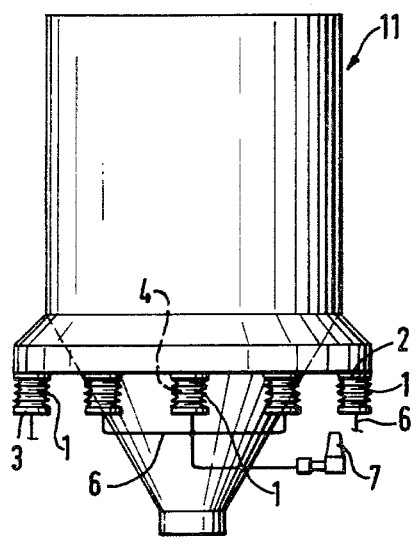
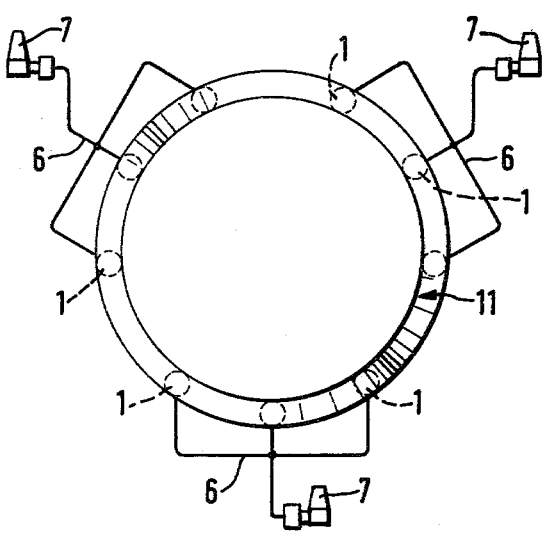
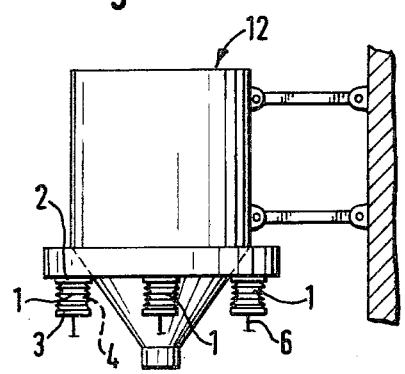
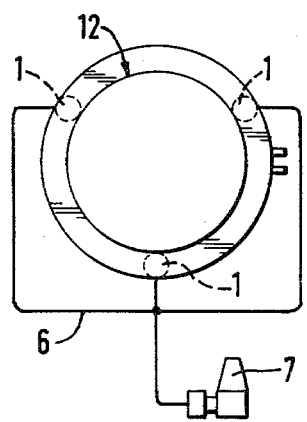

PICK-UP FOR MEASURING FORCES OR WEIGHT LOADS

This inventionn relates to the production of a hydraulic force pick-up which, used on its own or in parallel with other pick-ups, converts a weight, a load or a force into pressure and, by using a pressure transducer, enables a continuous electrical signal to be obtained, which can be processed and which accurately measures the applied force.

The advantages of such a system are as follows:

(a) Forces ranging from a few grams to several hundred tonnes can be measured using a few simple components.

(b) The apparatus constructed can be calibrated by means of loads which are very small with respect to the measured forces, by adding a circuit in parallel to the main circuit.

(c) Several series of pick-ups can be installed over the periphery of a large bulky installation requiring to be weighed, and by the law of communicating vessels these pick-ups will distribute the applied loads and thus reduce the high point loadings and reactions and hence result in lighter and hence cheaper constructions.

(d) The pick-up and transducer assembly comprises a static apparatus which, since it does not require any mechanical connection, is completely insensitive to industrial vibration.

(e) The force measurement curve is practically linear and the accuracy obtained is better than 0.25%, so that an overall accuracy better than 0.5% can be obtained, more particularly, in respect of application to continuous metering, and this applies particularly with the metering device forming the subject matter of Belgian Pat. No. 850 548.

(f) As a result of its relatively large support surface and its actual design, the pick-up can be installed without any special precautions.

(g) The crushing of the body due to the application of the force or load is negligible and does not affect the operation or stability of the installations in which the pick-up is used.

(h) The pick-up does not absorb any energy during its deformation since, on the one hand, the latter is negligible and, on the other hand, there is no friction and the resistance of the pick-up body to compression is practically zero or negligible.

A pick-up for measuring forces or weight loads and constructed according to the invention is characterised in that it comprises a body which is flexible in its length and fixed in its cross-section and which is disposed between a plate for receiving the applied force and a support plate, said body containing a liquid which converts the force into pressure, said body also being connected to a pressure transducer.

The invention will now be described in greater detail with reference to the accompanying diagrammatic drawings which show the following solely by way of example:

FIG. 1 a pick-up according to the invention.

FIG. 2 another pick-up according to the invention associated with a second pick-up for calibration.

FIG. 3 an application of the invention to a metering device as described in Belgian Pat. No. 850 548 and associated with a second pick-up for calibration.

FIG. 4 an application of the invention as a balance for a fully-weighed long conveyor.

FIGS. 5 and 6 are respectively an elevation and plan view of an application of the invention as a balance for silos.

FIGS. 7 and 8 are respectively an elevation and plan view of an application of the invention as a balance beneath a small vertically guided weighed hopper and FIGS. 9 to 11 show three alternative constructions of the flexible body of the pick-up according to the invention.

Figure 1:
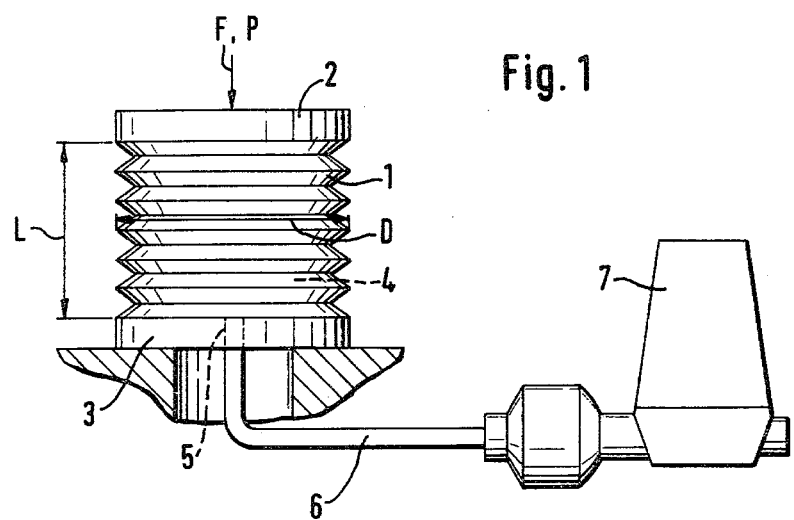

Referring to FIG. 1 of the drawings, the pick-up according to the invention comprises a body 1, which is flexible in its length L and fixed in respect of its cross-section D, the said body being disposed between a plate 2, which receives the applied force F or P—which may range from a few grams to several hundred tonnes—and a support plate 3.

Body 1 contains a liquid 4 which converts the force into pressure and which flows to a pressure transducer 7 via an orifice 5 in the body and a conduit 6. The pressure transducer, which converts the pressure to a continuous signal, may be a commercial device of the kind marketed by Messrs. Honeywell as a "diffused silicon transmitter".

If the measurement is to be carried out with calibration, a second pick-up is associated with the above pick-up.

Figure 2:
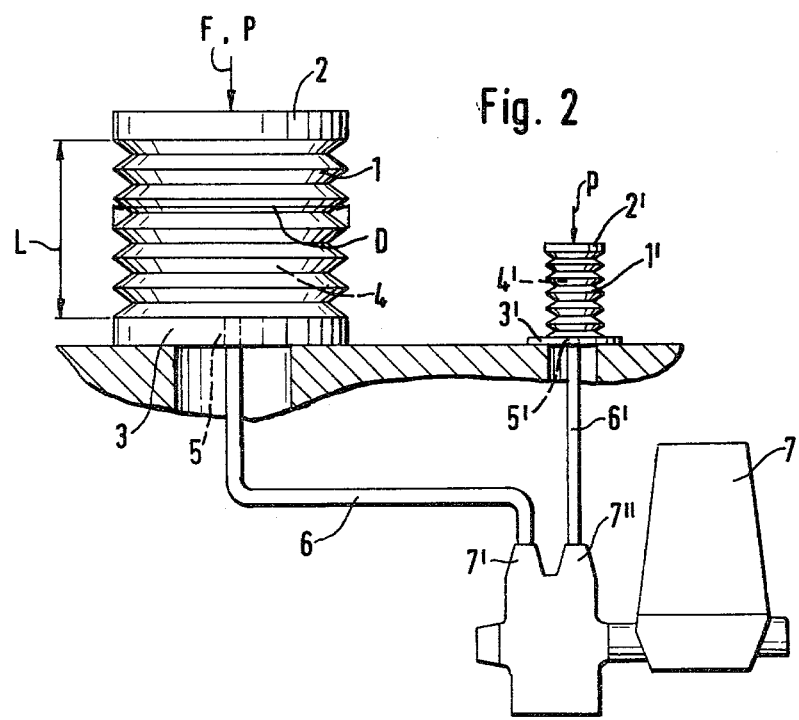

Referring to FIG. 2, a second pick-up (1' to 6') which is similar to the main pick-up (1 to 6) but of reduced section, is connected to the second input 7" of a direct or inverse action differential pressure transmitter 7, the conduit 6 of the main pick-up being in turn connected to the first input 7' of said pressure transmitter.

The apparatus can be calibrated by applying or removing the load p at the reception plate 2'.

A pick-up constructed according to the invention can be used in every area in which forces or weight loads are required to be measured.

Figure 3:
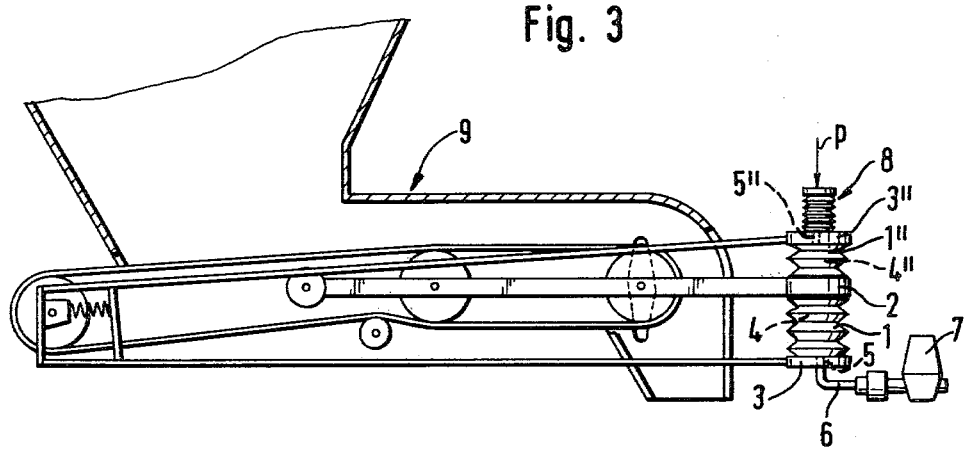

In FIG. 3, the above-described force pick-up is situated at the end of the rigid frame of the movable part of the metering device bearing the general reference 9 and forming the subject-matter of Belgian Pat. No. 850 548 mentioned only for background information. This pick-up is also provided with a variant of the calibration device shown in FIG. 2.

Referring to FIG. 3, a body 1" identical to body 1 is disposed symmetrically between the plate 2 and a plate 3" connected to the plate 3. An orifice 5" provided in the plate 3" provides communication between the body 1" and a second pick-up 8, which is similar but of smaller section, and to the reception plate of which the calibrating force p is applied.

In continuous metering the output signal can be used to control metering.

Figure 4:
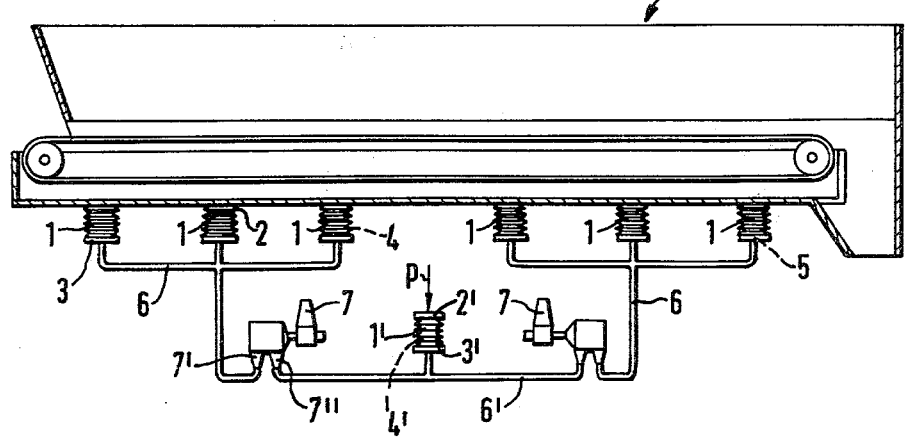

FIG. 4 shows another application of a pick-up according to the invention. A long conveyor 10 is weighed completely on two separate groups of pick-ups 1-6, the pick-ups in each of these groups being interconnected and each group being connected to a pressure transducer 7. In the case of FIG. 4, an additional calibrating device has been added (1'-6').

Yet another application shown in FIGS. 5 and 6 comprises a large-capacity silo 11, which is weighed on three separate groups of pick-ups 1-6, and this allows substantially uniform distribution of the loads over the periphery of the annular surface. The groups disposed in this way thus provide stability for the complete silo.

FIGS. 7 and 8 show another application comprising a small hopper 12 disposed on three pick-ups 1-6 which are interconnected and also connected to a single pressure transducer 7. The stability of the system is provided by a vertical guide system.

Figure 9:
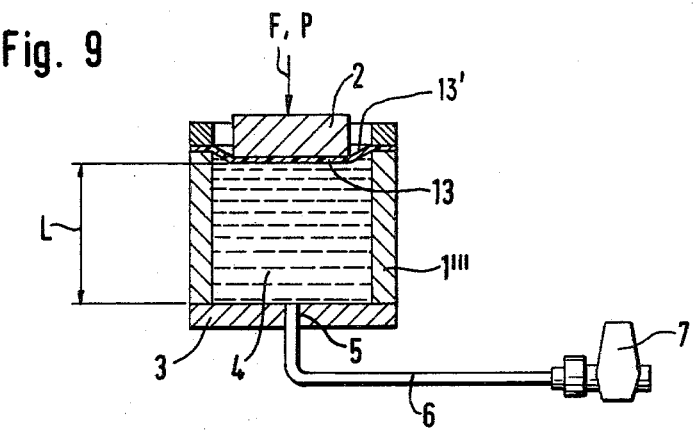
Figure 10:
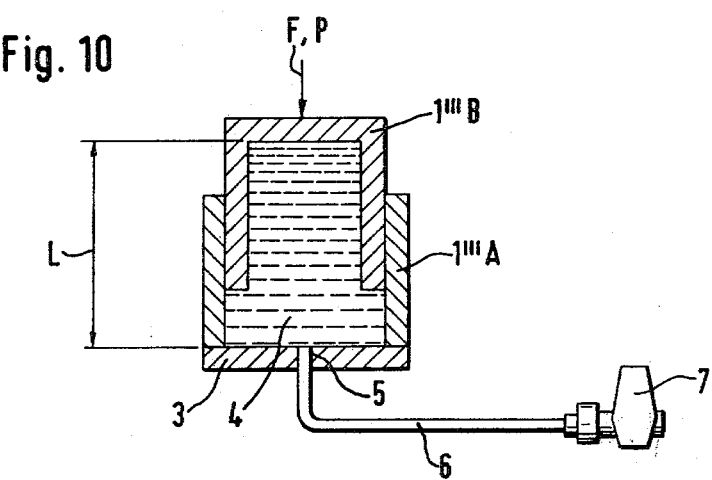
Figure 11:
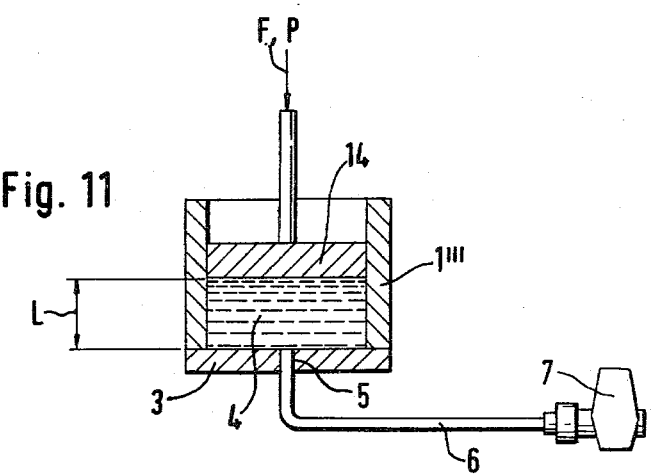

Although the flexibility of the length of the body of the pick-up can be obtained by deformation of the body itself as shown in FIGS. 1 and 2, it can of course alternatively be obtained, if the body is made rigid, either by deformation of the annular membrane portion 13' of a diaphragm 13 bearing the reception plate 2 and situated at the end of the body 1''', the annular membrane portion 13' being substantially smaller than the diameter of the reception plate 2 and covers the small gap between the inner wall of the body 1''' and the reception plate 2 (FIG. 9) or by telescoping of a two-element body 1'''A, 1'''B, the latter element forming the reception plate (FIG. 10), or by displacement, in the body 1''', of a piston 14 which forms the reception plate (FIG. 11). In the latter two cases the friction must be made negligible or else it must be taken into account in the measurement.

Inter alia, a pick-up according to the invention can be used as a balance for a weighbridge, a balance in strip production lines in which the tensile forces in the manufactured or processed strips have to be monitored; or an instrument for measuring the momentum either when a flow of material impinges on a suitable sensing device or by measuring the reaction due to the displacement of a given flow of material.

I claim:

1. A detector for the measurement of forces or loads of weight, comprising
   a pressure transducer,
   a reception plate means for receiving a force applied,
   a support plate,
   a rigid body defining a length, said body being incompresible in said length and unchangeable in its cross-section and arranged between said plate means and said support plate,
   said body defining a chamber having a peripheral wall defining a chamber containing a liquid means for transforming said force into pressure and for being operatively connected to said pressure transducer,
   said reception plate means disposed in said body at a top of said chamber spaced close to said peripheral wall of said body defining a gap around said reception plate means between the latter and said peripheral wall, said gap being small relative to the corresponding dimension of said reception plate means,
   a diaphragm means, having an annular membrane portion connected to said body and said reception plate means and enclosing said gap therebetween, for providing flexibility by deformation of said annular membrane portion,
   a second of said detector having reduced cross-section compared to the first said detector and connected to said pressure transducer, the latter constituting a differential pressure transducer, whereby measurements with standardization are made, said first and said second detectors are connected to said pressure transducers via two respective inlets of the latter.

2. A detector for the measurement of forces or loads of weight, comprising
   a pressure transducer,
   a reception plate means having a free surface for receiving a force applied anywhere on the free surface, said reception plate means having another surface on a side opposite to said free surface,
   a support plate,
   a rigid body defining a length, said body being incompresible in said length and unchangeable in its cross-section and arranged between said plate means and said support plate,
   said body defining a chamber having a peripheral wall defining a chamber containing a liquid means for transforming said force into pressure and for being operatively connected to said pressure transducer,
   said reception plate means disposed in said body at a top of said chamber spaced close to said peripheral wall of said body defining a gap around said reception plate means between the latter and said peripheral wall, said gap being small relative to the corresponding dimension of said reception plate means,
   a diaphragm means, having an annular membrane portion connected to said body and to said another surface of said reception plate means for supporting the latter and enclosing said gap therebetween, and for providing flexibility by deformation of said annular membrane portion only in a direction of said length,
   said pressure transducer with one inlet constitutes means for direct action.

3. The detector as set forth in claim 1, wherein said pressure transducer with said two respective inlets constitutes means for inverse action.

4. A detector for the measurement of forces or loads of weight, comprising
   a pressure transducer,
   a reception plate means for receiving a force applied,
   a support plate,
   a rigid body defining a length, said body being incompresible in said length and unchangeable in its cross-section and arranged between said plate means and said support plate,
   said body defining a chamber having a peripheral wall defining a chamber containing a liquid means for transforming said force into pressure and for being operatively connected to said pressure transducer,
   said reception plate means disposed in said body at a top of said chamber spaced close to said peripheral wall of said body defining a gap around said reception plate means between the latter and said peripheral wall, said gap being small relative to the corresponding dimension of said reception plate means,
   a diaphragm means, having an annular membrane portion connected to said body and said reception plate means and enclosing said gap therebetween, for providing flexibility by deformation of said annular membrane portion,
   a second of said detector is connected coaxially on top of a first of said detector with the respective of said support plates moveably mounted and connected to each other so as to form a symmetrical double body, said second detector being connected coaxially and in fluid communication to a third of said detector of reduced cross-section compared to the other said detectors and said first detector being connected in fluid communication to said pressure transducer for making measurements with standardization.

5. The detector as set forth in claim 4, further comprising a lever connected to said respective support plates, the latter constituting a pressure transmitting plate, said second and third detectors are identical and disposed inversely relative to each other, said pressure transmitting plate non-communicatingly connecting said first and second detectors such that said chambers of said first and second detectors are not in fluid communication.

6. The detector as set forth in claim 1, further comprising
a conduit connected to said pressure transducer and centrally connected to said chamber at a bottommost portion centrally through said support plate, respectively.

* * * * *